(12) United States Patent
Kubodera et al.

(10) Patent No.: US 7,077,223 B2
(45) Date of Patent: Jul. 18, 2006

(54) HYBRID VEHICLE

(75) Inventors: Masao Kubodera, Shioya-gun (JP); Tetsu Sugiyama, Utsunomiya (JP); Osamu Saito, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 84 days.

(21) Appl. No.: 10/443,989

(22) Filed: May 23, 2003

(65) Prior Publication Data

US 2003/0221883 A1  Dec. 4, 2003

(30) Foreign Application Priority Data

May 29, 2002  (JP)  ............................ P2002-155638
May 29, 2002  (JP)  ............................ P2002-155639

(51) Int. Cl.
*B60K 6/02* (2006.01)

(52) U.S. Cl. ...................... 180/65.2; 701/22; 903/941

(58) Field of Classification Search ................ 180/65.2, 180/65.3, 65.4, 65.8; 701/22; 477/3; 903/941
See application file for complete search history.

(56) References Cited

U.S. PATENT DOCUMENTS

| | | | |
|---|---|---|---|
| 5,725,064 A | | 3/1998 | Ibaraki et al. |
| 6,116,363 A | | 9/2000 | Frank |
| 6,190,282 B1 * | | 2/2001 | Deguchi et al. ................ 477/5 |
| 6,380,640 B1 | | 4/2002 | Kanamori et al. |
| 6,437,456 B1 * | | 8/2002 | Kimura et al. ............ 290/40 C |
| 6,480,767 B1 * | | 11/2002 | Yamaguchi et al. ........... 701/22 |
| 6,554,088 B1 * | | 4/2003 | Severinsky et al. ........ 180/65.2 |
| 6,563,230 B1 * | | 5/2003 | Nada ........................ 290/40 C |
| 6,570,265 B1 * | | 5/2003 | Shiraishi et al. ........... 290/40 C |
| 6,647,326 B1 * | | 11/2003 | Nakamori et al. ............. 701/22 |
| 6,799,650 B1 * | | 10/2004 | Komiyama et al. ........ 180/65.2 |
| 6,823,954 B1 * | | 11/2004 | Shimabukuro et al. .... 180/65.2 |

FOREIGN PATENT DOCUMENTS

| | | |
|---|---|---|
| DE | 100 35 027 A | 1/2002 |
| JP | 57-131840 | 8/1982 |
| JP | 59-204402 | 11/1984 |
| JP | HEI 01-153330 | 6/1989 |
| JP | 6-48190 | 2/1994 |
| JP | 8-237809 | 9/1996 |
| JP | 09-004479 | 1/1997 |
| JP | 2001-173479 | 6/2001 |

* cited by examiner

*Primary Examiner*—Jeff Restifo
(74) *Attorney, Agent, or Firm*—Arent Fox PLLC (57) ABSTRACT

A hybrid vehicle comprises an engine and a motor as power sources, the output power of at least one of the engine and the motor being transmitted to driving wheels for driving the hybrid vehicle, an accelerator pedal for increasing and decreasing driving power of the hybrid vehicle, and a drive control section which is provided for operating and stopping the engine and the motor, and which is adapted to control the engine and the motor in such a manner that when the engine is stopped and the motor is operated solely for driving the hybrid vehicle, change in desired output power is predicted, and the engine is maintained to be stopped, even when the predicted output power falls in a drive zone in which the engine is supposed to be operated, when the movement of the accelerator pedal in a predetermined period is less than a predetermined amount, and that the motor is controlled so as to output the predicted output power for continuing drive of the vehicle solely by the motor.

15 Claims, 5 Drawing Sheets

HYBRID VEHICLE

BACKGROUND OF THE INVENTION

1. Field of the Invention

The present invention relates to a hybrid vehicle which comprises an engine and a motor as power sources, and in which the power of at least one of the engine and the motor is transmitted to driving wheels for driving the hybrid vehicle.

2. Description of the Related Art

In general, in hybrid vehicles of the above-mentioned type, two drive zones, i.e., a drive zone in which an engine is operated (hereinafter this zone is referred to as an "engine drive zone") and another drive zone in which a motor is operated (hereinafter this zone is referred to as a "motor drive zone"), are prepared in advance, and the present drive mode is appropriately determined in one of the drive zones so as to improve fuel economy.

To this end, conventionally, the drive mode is determined in one of the engine drive zone and motor drive zone based on an opening degree signal of an accelerator, or alternatively, the drive mode is appropriately switched according to a map in which the engine drive zone and motor drive zone are defined, respectively, based on parameters such as an opening degree signal of an accelerator, a vehicle speed, an engine revolution rate (or motor revolution rate), etc.

In the hybrid vehicle disclosed in Japanese Unexamined Patent Application, First Publication No. Hei 1-153330, the opening degree of the throttle of an engine and power of a motor are controlled based on a vehicle speed and the opening degree of an accelerator.

However, in the above conventional hybrid vehicles, because the drive mode is determined with reference to the fixed engine drive zone or motor drive zone, the drive mode may be switched too frequently since the drive mode may be switched due to small movement of the accelerator operated by the driver, or due to changes in vehicle conditions and environment. Moreover, switching of the drive mode may be delayed even when an urgent acceleration is required, and in addition, the motor may be used less frequently so that fuel economy is degraded.

Furthermore, in the above conventional hybrid vehicles, because the engine is controlled according to the fixed engine drive zone and motor drive zone, a further problem is encountered in that the drive mode is not quickly switched to the engine drive mode upon request of an urgent acceleration when the vehicle runs in the motor drive mode, i.e., response of the vehicle is not sufficient.

SUMMARY OF THE INVENTION

Based on the above circumstances, an object of the present invention is to provide a hybrid vehicle in which the drive mode is prevented from being switched unnecessarily so as to reduce frequency of switching, the drive mode can be quickly switched when acceleration is required, and thus drivability of the vehicle is enhanced.

Another object of the present invention is to provide a hybrid vehicle which enables an excellent response upon demand of acceleration.

In order to achieve the above object, the present invention provides a hybrid vehicle comprising: an engine and a motor as power sources, the output power of at least one of the engine and the motor being transmitted to driving wheels for driving the hybrid vehicle; an accelerator pedal for increasing and decreasing driving power of the hybrid vehicle; and a drive control section which is provided for operating and stopping the engine and the motor, and which is adapted to control the engine and the motor in such a manner that when the engine is stopped and the motor is operated solely for driving the hybrid vehicle, change in desired output power is predicted, and the engine is maintained to be stopped, even when the predicted output power falls in a drive zone in which the engine is supposed to be operated, when the movement of the accelerator pedal in a predetermined period is less than a predetermined amount, and that the motor is controlled so as to output the predicted output power for continuing drive of the vehicle solely by the motor. The movement of the accelerator pedal may be measured by an accelerator pedal output measuring section.

According to the hybrid vehicle configured as described above, it is possible to fulfill an acceleration demand just by increasing the output power of the motor without operating the engine when the movement of the accelerator pedal in a predetermined period, which defines the acceleration demand, is less than the predetermined amount.

In the above hybrid vehicle, a drive zone in which the motor is operated solely for driving the hybrid vehicle may be defined as a motor drive zone.

According to the hybrid vehicle configured as described above, it is possible to fulfill an acceleration demand just by increasing the output power of the motor without operating the engine when the above conditions are satisfied and even when the operating point of the hybrid vehicle (i.e., a combination point of various conditions at which the vehicle is operated) is in the motor drive zone.

In the above hybrid vehicle, change in desired output power may be predicted based on the movement of the accelerator pedal in the predetermined period.

According to the hybrid vehicle configured as described above, it is possible to predict change in desired output power easily and accurately.

In the above hybrid vehicle, the drive control section may be further adapted to control in such a manner that the engine is started regardless of whether or not the movement of the accelerator pedal in the predetermined period is less than the predetermined amount when the predicted output power is greater than the maximum output power of the motor. In this context, the "maximum output power of the motor" means the highest level of power that can be output by the motor.

According to the hybrid vehicle configured as described above, the predicted output power can be reliably output by starting the engine even when the predicted output power cannot be output by the motor.

In the above hybrid vehicle, the drive control section may be further adapted to control in such a manner that the engine is started when the movement of the accelerator pedal in the predetermined period is greater than the predetermined amount.

According to the hybrid vehicle configured as described above, it is possible to fulfill an urgent acceleration demand by starting the engine when the hybrid vehicle is driven solely by the motor.

In the above hybrid vehicle, the drive control section may be further adapted to control in such a manner that the motor is maintained to output power even after starting of the engine.

According to the hybrid vehicle configured as described above, the power of the engine is restrained, and it is possible to achieve the predicted and desired output power using the engine together with the motor.

In the above hybrid vehicle, the drive control section may be further adapted to control in such a manner that the output power of the motor is decreased as the output power of the engine increases after starting of the engine.

According to the hybrid vehicle configured as described above, an excessive output of the motor may be avoided.

In the above hybrid vehicle, the drive control section may be further adapted to control in such a manner that change in the output power of the motor is limited in a predetermined range.

According to the hybrid vehicle configured as described above, a rapid change in the driving power may be avoided.

The present invention further provides a hybrid vehicle comprising: an engine and a motor as power sources, the output power of at least one of the engine and the motor being transmitted to driving wheels for driving the hybrid vehicle; an accelerator pedal for increasing and decreasing driving power of the hybrid vehicle; and a drive control section which is provided for operating and stopping the engine and the motor, and which is adapted to control the engine and the motor in such a manner that, when the motor is operated solely for driving the hybrid vehicle, the engine is started when the movement of the accelerator pedal in a predetermined period is greater than a predetermined amount. The movement of the accelerator pedal may be measured by an accelerator pedal output measuring section.

According to the hybrid vehicle configured as described above, it is possible to fulfill an urgent acceleration demand, when the hybrid vehicle is driven solely by the motor, by starting the engine so that the engine is also used as a power source of the hybrid vehicle.

In the above control device for a hybrid vehicle, a drive zone in which the motor is operated solely for driving the hybrid vehicle may be defined as a motor drive zone, and the drive control section may be further adapted to control in such a manner that the engine is started in the motor drive zone.

According to the hybrid vehicle configured as described above, it is possible to fulfill an urgent acceleration demand, when the operation state of the hybrid vehicle is in the motor drive zone in which the hybrid vehicle is driven solely by the motor, by starting the engine so that the engine is also used as a power source of the hybrid vehicle.

In the above control device for a hybrid vehicle, the movement of the accelerator pedal in the predetermined period may be determined by the rate at which the accelerator pedal is depressed.

According to the hybrid vehicle configured as described above, when the rate at which the accelerator pedal is depressed is high, the movement of the accelerator pedal in the predetermined period is large, and thus it is possible to determine that there is an urgent acceleration demand.

In the above control device for a hybrid vehicle, the drive control section may be further adapted to control in such a manner that the motor is maintained to output power even after starting of the engine.

According to the hybrid vehicle configured as described above, the power of the engine is restrained, and it is possible to achieve the desired output power using the engine together with the motor.

In the above control device for a hybrid vehicle, the drive control section may be further adapted to control in such a manner that the output power of the motor is decreased as the output power of the engine increases after starting of the engine.

According to the hybrid vehicle configured as described above, an excessive output of the motor may be avoided.

In the above control device for a hybrid vehicle, the drive control section may be further adapted to control in such a manner that the output power of the motor after starting of the engine is limited to be less than the maximum output power of the motor. In this context, the "maximum output power of the motor" means the heist level of power that can be output by the motor.

According to the hybrid vehicle configured as described above, it is possible to restrain the power of the motor after starting of the engine to a level below the maximum output power of the motor.

In the above control device for a hybrid vehicle, the maximum output power of the motor may be set to be greater than the power which is necessary to drive the hybrid vehicle solely by the motor.

According to the hybrid vehicle configured as described above, it is possible to drive the hybrid vehicle solely by the motor.

DESCRIPTION OF THE PREFERRED EMBODIMENTS

Preferred embodiments of a hybrid vehicle according to the present invention will be explained below with reference to FIGS. 1 to 7.

First Embodiment

Figure 1:
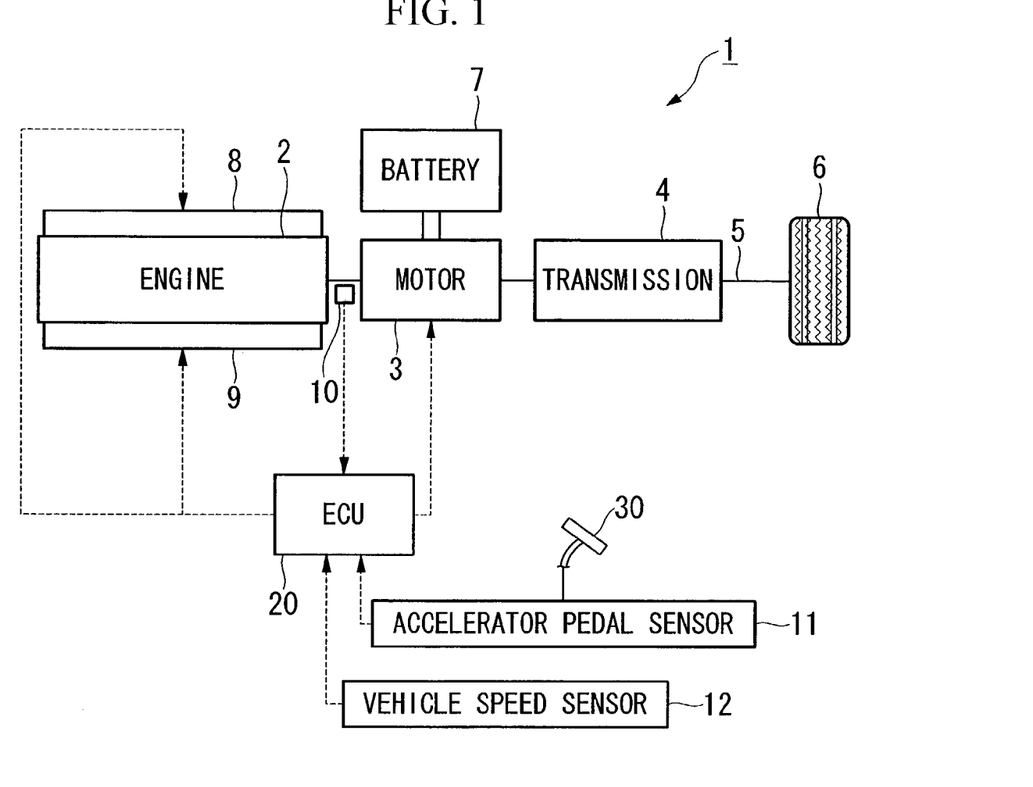
FIG. 1 is a schematic diagram showing the general structure of a power transmission system in first and second embodiments of a hybrid vehicle according to the present invention.

A first embodiment will be explained below with reference to FIGS. 1 to 4. FIG. 1 is a schematic diagram showing the general structure of a power transmission system in the first embodiment of a hybrid vehicle according to the present invention.

In the hybrid vehicle 1, an engine 2 and a motor 3 that is capable of generating electrical power (hereinafter referred to as a "motor-generator") are directly coupled to each other in series, and the power of at least one of the engine 2 and the motor-generator 3 is transmitted to driving wheels 6 of the hybrid vehicle 1 via a transmission 4 and an output shaft 5. The motor-generator 3 is operated by a battery 7. The driving wheel 6 may be either front wheels or rear wheels. The driver of the hybrid vehicle 1 can control the driving power of the hybrid vehicle 1 by adjusting the degree to which an accelerator pedal 30 is depressed.

The engine 2 is of a multi-cylinder reciprocating type, and comprises intake and exhaust valves for executing intake and exhaust operations in the cylinders, an intake and exhaust control device 8 for controlling the operations of the intake and exhaust valves of each of the cylinders, and a fuel injection and ignition control device 9 (i.e., a drive control section) for controlling fuel injection and ignition of injected fuel for each of the cylinders.

The hybrid vehicle 1 is configured such that a fuel cut control operation is executed, as necessary, in which fuel supply to all of the cylinders of the engine 2 is suspended by the fuel injection and ignition control device 9, and a cylinder deactivation control operation is executed, as necessary, in which the intake and exhaust valves of all of the cylinders of the engine 2 are maintained to be closed by the intake and exhaust control device 8 along with suspending fuel supply to all of the cylinders of the engine 2 by the fuel injection and ignition control device 9.

The hybrid vehicle 1 further comprises an engine revolution rate sensor 10 for measuring the revolution rate of the crankshaft of the engine 2 (hereinafter referred to as an "engine revolution rate NE"), an accelerator pedal sensor 11 for measuring the output of the accelerator pedal 30, i.e., the depressed amount of the accelerator pedal 30, and a vehicle speed sensor 12 for measuring a vehicle speed. The accelerator pedal sensor 11 forms an accelerator pedal output measuring section. The output signals of the sensors 10, 11, and 12 are input into an ECU 20, and based on the input signals from the sensors 10, 11, and 12 and the like, the ECU 20 controls the engine 2 and the motor-generator 3 so as to operate and stop the engine 2 and the motor-generator 3, or so as to adjust the outputs of the engine 2 and the motor-generator 3.

The drive mode of the hybrid vehicle 1 configured as described above comprises five drive modes, i.e., (1) a motor drive mode, (2) an engine drive mode, (3) a cruise mode, (4) a motor assist mode, and (5) a regenerative deceleration mode.

The motor drive mode is a drive mode in which the motor-generator 3 is used as a motor, the vehicle is solely driven thereby, and the cylinder deactivation control operation is applied to the engine 2 for reducing pumping loss of the engine 2.

The engine drive mode is a drive mode in which the hybrid vehicle is driven solely by the engine 2, and the motor-generator 3 is substantially in a stopped state in which neither generation nor consumption of electrical energy is executed.

The cruise mode is a drive mode in which the engine 2 is operated for driving the vehicle, and the motor-generator 3 is used as a generator for converting a portion of the power of the engine 2 into electrical energy that is charged into the battery 7.

The motor assist mode is a drive mode in which the engine 2 is operated and the motor-generator 3 is used as a motor so that the vehicle is driven by the powers of the engine 2 and motor-generator 3.

The regenerative deceleration mode is a drive mode during deceleration of the vehicle in which the motor-generator 3 is used as a generator for executing a regenerative operation so as to convert deceleration kinetic energy into regenerated energy that is charged into the battery 8 as electrical energy. In the regenerative deceleration mode, the fuel cut control operation is applied to the engine 2.

TABLE 1 shows the operation states of the engine 2 and motor-generator 3 in each of the drive modes explained above.

TABLE 1

| Drive mode | Operation state of engine | Operation state of motor |
|---|---|---|
| Motor drive mode | Stopped (cylinder deactivation is applied) | Operated (outputting power for driving) |
| Engine drive mode | Operated | Stopped |
| Cruise mode | Operated | Operated (generating electrical power for battery charge) |
| Motor assist mode | Operated | Operated (outputting power for assisting engine) |
| Regenerative deceleration mode | Stopped (fuel cut is applied) | Operated (generating electrical power for battery charge) |

Figure 2:
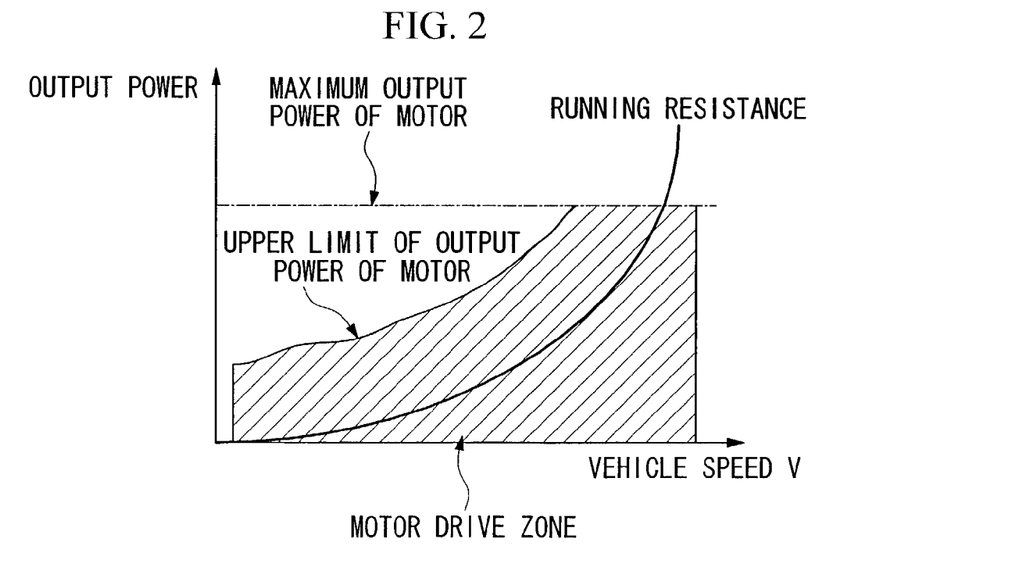
FIG. 2 is diagram illustrating a motor drive zone in the first and second embodiments.

FIG. 2 is a diagram illustrating a motor drive zone defined in the first embodiment. In FIG. 2, the motor drive zone is indicated by a hatched area. In the hybrid vehicle 1, the upper limit of the output power of the motor-generator 3 during the motor drive mode is set in advance depending on the vehicle speed. When an operating point of the hybrid vehicle 1, which is defined by output power PWRREQ that is necessary to drive the hybrid vehicle 1 (hereinafter referred to as a "desired output power") and the vehicle speed V, is in the motor drive zone, the motor drive mode is selected in which, basically, the vehicle is driven solely by the motor-generator 3. The desired output power PWRREQ is determined depending on the engine revolution rate NE and the depressed amount AP of the accelerator pedal 30. The desired output power PWRREQ in the motor drive mode is set to be less than the maximum output power of the motor-generator 3. When the operating point of the hybrid vehicle 1 is out of the motor drive zone, the engine drive mode or the motor assist mode is selected.

In the hybrid vehicle 1 of the present embodiment, when the motor drive mode is selected, change in the desired output power of the hybrid vehicle 1 is predicted based on the movement of the accelerator pedal 30 in a predetermined period, and a control operation is executed in such a manner that the desired output power that is predicted (hereinafter referred to as a "predicted and desired output power") is achieved.

As described above, when the operating point of the hybrid vehicle 1 is in the motor drive zone, the motor drive mode is selected in which, basically, the vehicle is driven solely by the motor-generator 3; however, in the case of the hybrid vehicle 1 of the present embodiment, when the current operating point is in the motor drive zone, the predicted and desired output power is out of the motor drive zone, and the movement of the accelerator pedal 30 in a predetermined period is less than a predetermined value, the engine 2 is maintained to be stopped, and the motor-generator 3 is maintained to be solely operated to output the predicted and desired output power, so that frequent switching between the power sources is avoided.

When the predicted and desired output power is greater than the maximum output power of the motor-generator 3, the motor-generator 3 cannot achieve the predicted and desired output power alone; therefore, in this case, the engine 2 is started regardless of whether or not the movement of the accelerator pedal 30 in a predetermined period is less than the predetermined value, so that not only the motor-generator 3 but also the engine 2 together achieve the predicted and desired output power. On the other hand, when the movement of the accelerator pedal 30 in a predetermined period is greater than the predetermined value, which means that an urgent acceleration is required, the engine 2 is started, as in the above case, so that not only the motor-generator 3 but also the engine 2 together achieve the predicted and desired output power.

Figure 3:
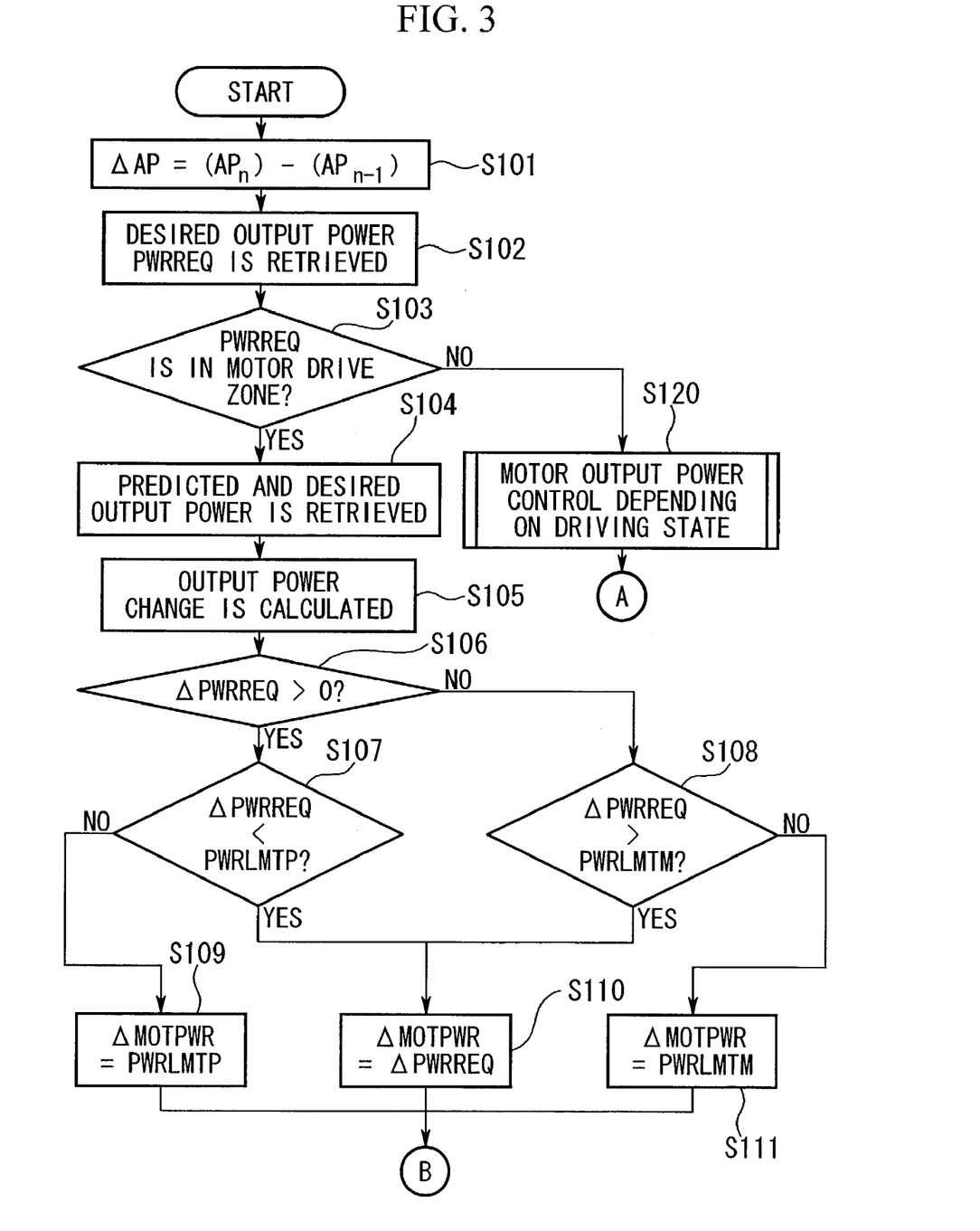
FIG. 3 is a flowchart showing the operation for calculating a motor output command in the first embodiment (part 1).
Figure 4:
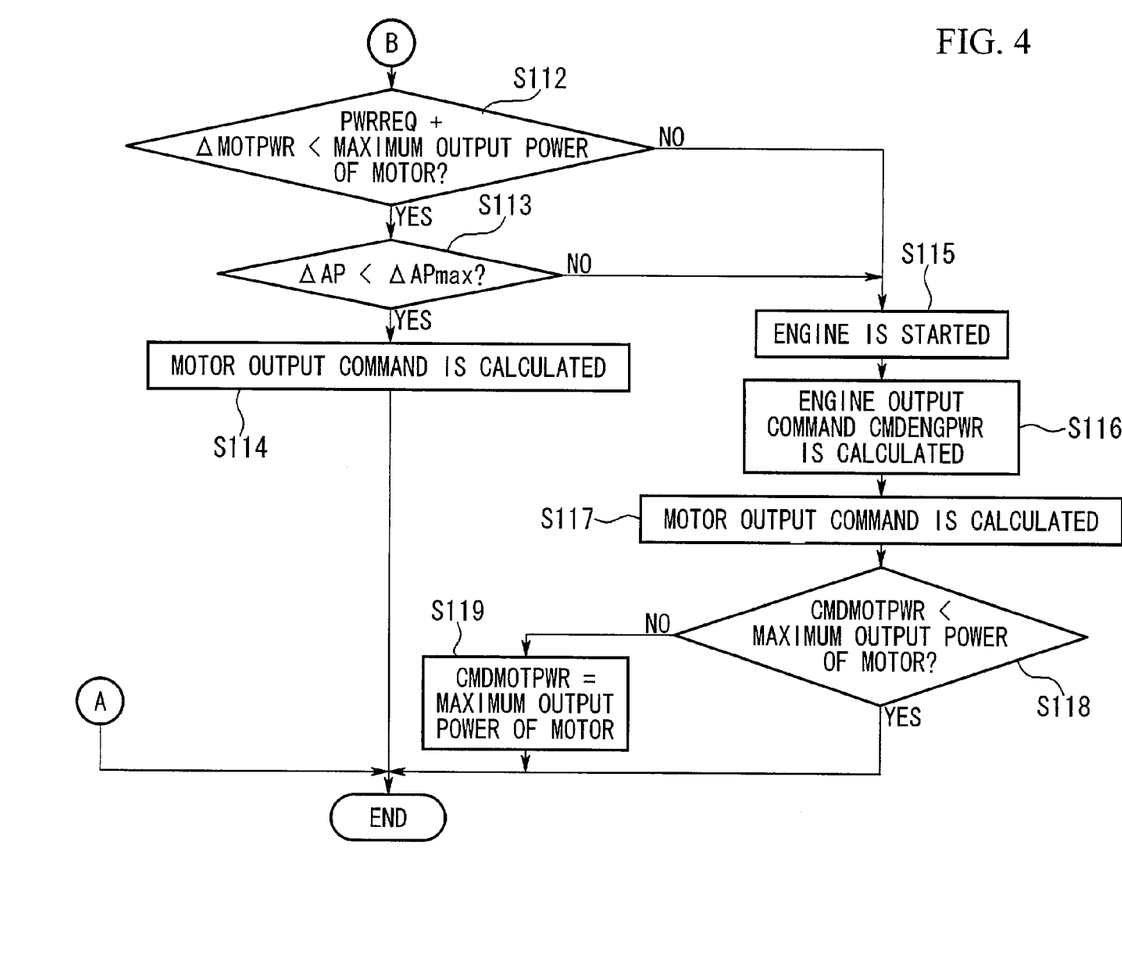
FIG. 4 is a flowchart showing the operation for calculating a motor output command in the first embodiment (part 2).

FIGS. 3 and 4 are flowcharts showing the operation for calculating a motor output command, and the operation for calculating the motor output command will be explained below with reference to FIGS. 3 and 4. The control routine for calculating the motor output command shown in FIGS. 3 and 4 is periodically (e.g., at every 10 to 20 ms) executed by the ECU 20.

In step S101, the movement $\Delta AP$ of the accelerator pedal 30 is calculated by subtracting the depressed amount $AP_{n-1}$ of the accelerator pedal 30 measured by the accelerator pedal sensor 11 in the previous routine from the depressed amount $AP_n$ of the accelerator pedal 30 measured by the accelerator pedal sensor 11 in the current routine (hereinafter referred to as a "current depressed amount of the accelerator pedal 30").

$$\Delta AP = (AP_n) - (AP_{n-1})$$

More specifically, in step S101, change in the depressed amount of the accelerator pedal 30 during a period of execution of the control routine (e.g., 10 to 20 ms) is calculated. Accordingly, the movement of the accelerator pedal 30 $\Delta AP$ is determined by the rate at which the accelerator pedal 30 is depressed. In general, the driver's intention to have acceleration is clearly reflected in the rate at which the accelerator pedal 30 is depressed, i.e., in general, the driver quickly depresses the accelerator pedal 30 when the driver desires an urgent acceleration, and on the other hand, the driver slowly depresses the accelerator pedal 30 when the driver does not desire acceleration. The control operation in step S101 may be defined as determining the driver's intention with regard to acceleration, or determining urgency of acceleration.

In step S102, the desired output power PWRREQ is retrieved from a desired output power map or table (not shown), which is prepared in advance, depending on the engine revolution rate NE and the current depressed amount $AP_n$ of the accelerator pedal 30.

Next, the control operation proceeds to step S103, in which it is determined whether the desired output power PWRREQ determined in step S102 is the upper limit of the output power of the motor during the motor drive mode at the current vehicle speed V; in other words, it is determined whether or not the current operating point of the vehicle is in the motor drive zone.

When the result of determination in step S103 is "YES", i.e., when the current operating point of the vehicle is in the motor drive zone, the operation proceeds to step S104. In contrast, when the result of determination in step S103 is "NO", i.e., when the current operating point of the vehicle is not in the motor drive zone, the operation proceeds to step S120. When the operation proceeds to step S120, which means that a drive mode other than the motor drive mode is selected, the output power of the motor is appropriately controlled in accordance with a state of drive in the drive mode, and then the control operation in this routine is once terminated. Note that because the operation for controlling the output power of the motor in a drive mode other than the motor drive mode is not contained in the scope of the present invention, the explanation thereof is omitted.

In step S104, assuming that the rate at which the accelerator pedal 30 is depressed remains at the current level, a predicted depressed amount of the accelerator pedal 30 is calculated by adding the movement $\Delta AP$ of the accelerator pedal 30 calculated in step S101 to the current depressed amount $AP_n$ of the accelerator pedal 30, and then a predicted and desired output power, which is to be a predicted and desired output power YPWRREQ, is retrieved from the desired output power map or table depending on the predicted depressed amount ($=AP_n+\Delta AP$) of the accelerator pedal 30 and the current engine revolution rate NE. In other words, the predicted and desired output power YPWRREQ is predicted (or calculated) based on the movement $\Delta AP$ of the accelerator pedal 30, i.e., the movement of the accelerator pedal 30 in a predetermined period.

Next, the control operation proceeds to step S105, in which change in the desired output power APWRREQ (hereinafter simply referred to as an "output power change $\Delta PWRREQ$) is calculated by subtracting the current desired output power PWRREQ from the predicted and desired output power YPWRREQ. In this operation, the output power change $\Delta PWRREQ$ is predicted based on the movement $\Delta AP$ of the accelerator pedal 30 (i.e., the movement of the accelerator pedal 30 in a predetermined period), and thus change in the desired output power of the vehicle can be easily and accurately predicted.

Next, the control operation proceeds to step S106, in which it is determined whether or not the output power change $\Delta PWRREQ$ is a positive value.

When the result of determination in step S106 is "YES" (i.e., $\Delta PWRREQ>0$), the operation proceeds to step S107, in which it is determined whether the output power change $\Delta PWRREQ$ is less than an upper limit of output power change PWRLMTP. When the result of determination in step S107 is "YES" (i.e., $\Delta PWRREQ<PWRLMTP$), the operation proceeds to step S110, in which the output power change $\Delta PWRREQ$ calculated in step S105 is set to a motor output power change $\Delta MOTPWR$ ($\Delta MOTPWR=\Delta PWRREQ$). In contrast, when the result of determination in step S107 is "NO" (i.e., $\Delta PWRREQ \geq PWRLMTP$), the operation proceeds to step S109, in which the upper limit of output power change PWRLMTP is set to the motor output power change $\Delta MOTPWR$ ($\Delta MOTPWR=PWRLMTP$).

In contrast, when the result of determination in step S106 is "NO" (i.e., $\Delta PWRREQ \leq 0$), the operation proceeds to step S108, in which it is determined whether the output power change $\Delta PWRREQ$ is greater than a lower limit of output power change PWRLMTM. When the result of determination in step S108 is "YES" (i.e., $\Delta PWRREQ>PWRLMTM$), the operation proceeds to step S110, in which the output power change $\Delta PWRREQ$ calculated in step S105 is set to a motor output power change $\Delta MOTPWR$ ($\Delta MOTPWR=\Delta PWRREQ$). In contrast, when the result of determination in step S108 is "NO" (i.e., $\Delta PWRREQ \leq PWRLMTM$), the operation proceeds to step S111, in which the lower limit of output power change PWRLMTM is set to the motor output power change $\Delta MOTPWR$ ($\Delta MOTPWR=PWRLMTM$).

In other words, through the control operations in steps S109 and S111, the motor output power change $\Delta MOTPWR$ is limited within a predetermined range so that sharp acceleration and deceleration in the motor drive mode are prohibited.

After setting the motor output power change $\Delta MOTPWR$ in step S109, S110, or S111, the control operation proceeds to step S112, in which it is determined whether a value (hereinafter this value is referred to as a "desired output power after limitation"), which is obtained by adding the motor output power change $\Delta MOTPWR$ to the current desired output power PWRREQ, is less than the maximum output power of the motor-generator 3.

When the result of determination in step S112 is "YES" (i.e., PWRREQ+ΔMOTPWR<maximum output power of the motor-generator 3), the operation proceeds to step S113, in which it is determined whether the movement ΔAP of the accelerator pedal 30 determined in step S113 is less than an engine start triggering movement $\Delta AP_{max}$ of the accelerator pedal 30, which is set in advance.

When the result of determination in step S113 is "YES" (i.e., $\Delta AP < \Delta AP_{max}$), the operation proceeds to step S114, in which the desired output power after limitation (PWRREQ+ΔMOTPWR) is set as a motor output command CMDMOT-PWR, and the control operation in this routine is once terminated.

$$CMDMOTPWR = PWRREQ + \Delta MOTPWR$$

In other words, when the desired output power after limitation (PWRREQ+ΔMOTPWR) is less than the maximum output power of the motor-generator 3, and ΔAP is less than $\Delta AP_{max}$, the desired output power after limitation (PWRREQ+ΔMOTPWR) is achieved just by the motor-generator 3 so that drive of the vehicle just by the motor-generator 3 is continued. This control operation is also executed in the case in which the desired output power after limitation (PWRREQ+ΔMOTPWR) is greater than the upper limit of the output power of the motor-generator 3 during the motor drive mode at the current vehicle speed V, i.e., in the case in which the desired output power after limitation (PWRREQ+ΔMOTPWR) is positioned out of the motor drive zone, and is positioned in a zone in which the engine 2 is supposed to be operated. In this case, as in the above case, the intake and exhaust control device 8 maintains the intake and exhaust valves of all of the cylinder in the closed states, and the fuel injection and ignition control device 9 maintains the engine 2 in the stopped state so that the desired output power after limitation (PWRREQ+ΔMOTPWR) is achieved just by the motor-generator 3, and drive of the vehicle just by the motor-generator 3 is continued.

Accordingly, it is possible to fulfill an acceleration demand, in which the movement ΔAP of the accelerator pedal 30 is less than the engine start triggering movement $\Delta AP_{max}$ of the accelerator pedal 30, just by increasing the output power of the motor-generator 3 without operating the engine 2, and thereby the engine 2 may be prevented from being started and stopped frequently under the drive conditions in the vicinity of the boundary of the motor drive zone (i.e., in the vicinity of the upper limit of the output power of the motor-generator 3). Specifically, the frequency of starting and stopping of the engine 2 due to a small movement of the accelerator pedal at a low vehicle speed can be greatly reduced when compared with conventional cases.

Because the motor output power change ΔMOTPWR is restrained due to the control operations in steps S109 and S111, change in the motor output command CMDMOTPWR is also restrained. As a result, the driving power is prevented from being quickly changed; therefore, an unsmooth behavior of the vehicle may be avoided, and drivability of the vehicle may be improved.

In contrast, when the result of determination in step S113 is "NO" (i.e., $\Delta AP \geq \Delta AP_{max}$), the operation proceeds to step S115, in which the engine 2 is started.

In other words, even when the current operating point is in the motor drive zone, the fact that ΔAP is equal to or greater than $\Delta AP_{max}$ means that an urgent acceleration is required; therefore, the engine 2 is started to enhance responsiveness, and the desired output power after limitation (PWRREQ+ΔMOTPWR) is achieved using the engine 2 together with the motor-generator 3. As a result, drivability of the vehicle may be improved.

When the result of determination in step S112 is "NO" (i.e., PWRREQ+ΔMOTPWR≧maximum output power of the motor-generator 3), the desired output power after limitation (PWRREQ+ΔMOTPWR) cannot be achieved by the motor-generator 3; therefore, the operation proceeds not to step S113, but to step S115, in which the engine 2 is started. In other words, in this case, the engine 2 is started regardless of whether or not the movement ΔAP of the accelerator pedal 30 is less than the engine start triggering movement $\Delta AP_{max}$ of the accelerator pedal 30, and thus the desired output power after limitation (PWRREQ+ΔMOTPWR) is reliably achieved using the engine 2 together with the motor-generator 3. As a result, the driver's acceleration demand can be achieved, and drivability of the vehicle may be improved.

Then, the control operation proceeds from step S115 to step S116, in which an engine output command CMDENG-PWR is calculated based on the engine revolution rate NE and the current depressed amount AP of the accelerator pedal 30.

Next, the control operation proceeds to step S117, in which the motor output command CMDMOTPWR is calculated by subtracting the engine output command CMDENGPWR calculated in step S116 from the desired output power after limitation (PWRREQ+ΔMOTPWR).

$$CMDMOTPWR = PWRREQ + \Delta MOTPWR - CMDENGPWR \qquad \text{Equation (1)}$$

According to Equation (1), the output power of the motor-generator 3 after starting of the engine 2 is decreased as the output power of the engine 2 increases. As a result, the motor-generator 3 is prevented from outputting power excessively, and electrical power is prevented from being consumed unnecessarily so that fuel economy may be improved.

Next, the control operation proceeds from step S117 to step S118, in which it is determined whether the motor output command CMDMOTPWR calculated in step S117 is less than the maximum output power of the motor-generator 3.

When the result of the determination in step S118 is "YES" (i.e., CMDMOTPWR<maximum output power of the motor-generator 3), the control operation in this routine is once terminated. In other words, in this case, the motor output command CMDMOTPWR calculated in step S117 is used as the motor output command CMDMOTPWR without any changes.

In contrast, when the result of the determination in step S118 is "NO" (i.e., CMDMOTPWR≧maximum output power of the motor-generator 3), the operation proceeds to step S119, in which the maximum output power of the motor-generator 3 is set to the motor output command CMDMOTPWR (i.e., CMDMOTPWR=maximum output power of the motor-generator 3), and the control operation in this routine is once terminated.

Through the control operations in steps S118 and S119, the motor output command CMDMOTPWR after starting of the engine 2 is limited to a level equal to or less than the maximum output power of the motor-generator 3.

By operating the motor-generator 3 so as to output power even after the engine 2 is started, as explained above, the output power of the engine 2 is restrained, and thus responsiveness of the vehicle may be improved while improving fuel economy.

When the desired output power after limitation (PWRREQ+ΔMOTPWR) is achieved in the motor drive mode, as explained above, and when the desired output power PWRREQ in the next control routine is positioned out of the motor drive zone, the control operation proceeds to step S120, in which the drive mode is switched to a drive mode other than the motor drive mode.

Second Embodiment

A second embodiment will be explained below with reference to FIGS. 1, 2 and 5.

The general structure of a power transmission system in the second embodiment of a hybrid vehicle according to the present invention is the same as in the first embodiment shown in FIG. 1; therefore, the explanation thereof is omitted.

The drive mode of the hybrid vehicle 1 configured as in the first embodiment also comprises five drive modes, i.e., (1) a motor drive mode, (2) an engine drive mode, (3) a cruise mode, (4) a motor assist mode, and (5) a regenerative deceleration mode.

The operation states of the engine 2 and motor-generator 3 in each of the drive modes are the same as in the first embodiment which are shown in TABLE 1.

The motor drive zone defined in the second embodiment is also shown in FIG. 2. In FIG. 2, the motor drive zone is indicated by a hatched area. In the hybrid vehicle 1, the upper limit of the output power of the motor-generator 3 during the motor drive mode is set in advance depending on the vehicle speed. When an operating point of the hybrid vehicle 1, which is defined by output power PWRREQ that is necessary to drive the hybrid vehicle 1 (hereinafter referred to as a "desired output power") and the vehicle speed V, is in the motor drive zone, the motor drive mode is selected in which, basically, the vehicle is driven solely by the motor-generator 3. The desired output power PWRREQ is determined depending on the engine revolution rate NE and the depressed amount AP of the accelerator pedal 30. The desired output power PWRREQ in the motor drive mode is set to be less than the maximum output power of the motor-generator 3.

As described above, when the operating point of the hybrid vehicle 1 is in the motor drive zone, the motor drive mode is selected in which, basically, the vehicle is driven solely by the motor-generator 3; however, in the case of the hybrid vehicle 1 of the present embodiment, even when the operating point of the hybrid vehicle 1 is in the motor drive zone, if the driver wants an urgent acceleration, the engine 2 is started so that the drive mode is switched to the motor assist mode, and so that responsiveness of the vehicle with respect to an acceleration demand is improved.

Figure 5:
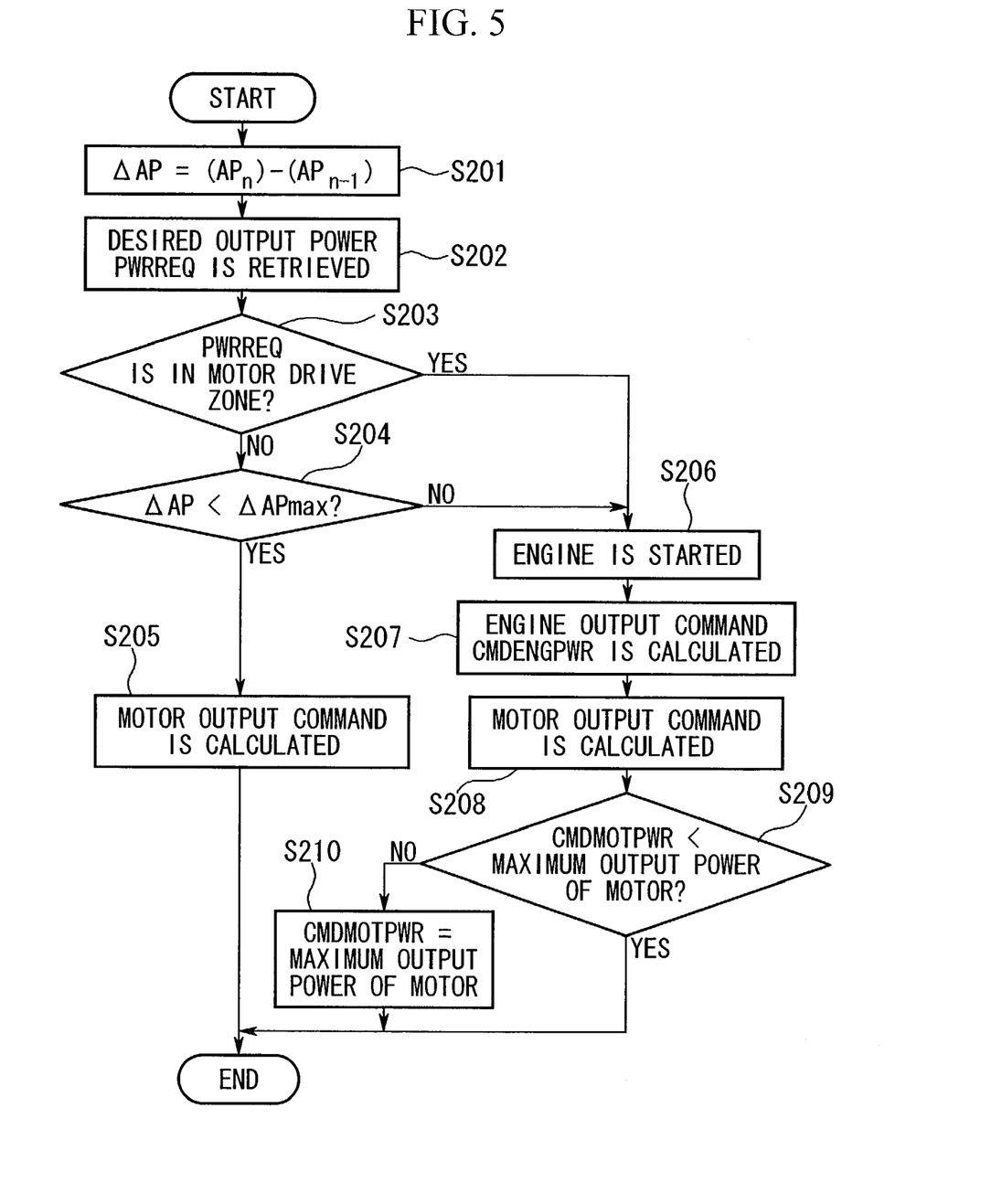
FIG. 5 is a flowchart showing the operation for calculating a motor output command in the second embodiment.

FIG. 5 is a flowchart showing the operation for calculating a motor output command, and the operation for calculating the motor output command will be explained below with reference to FIG. 5. The control routine for calculating the motor output command shown in FIG. 5 is periodically (e.g., at every 10 to 20 ms) executed by the ECU 20.

In step S201, the movement ΔAP of the accelerator pedal 30 is calculated by subtracting the depressed amount $AP_{n-1}$ of the accelerator pedal 30 measured by the accelerator pedal sensor 11 in the previous routine from the depressed amount $AP_n$ of the accelerator pedal 30 measured by the accelerator pedal sensor 11 in the current routine (hereinafter referred to as a "current depressed amount of the accelerator pedal 30").

$$\Delta AP = (AP_n) - (AP_{n-1})$$

More specifically, in step S201, change in the depressed amount of the accelerator pedal 30 during a period of execution of the control routine (e.g., 10 to 20 ms) is calculated. Accordingly, the movement of the accelerator pedal 30 ΔAP is determined by the rate at which the accelerator pedal 30 is depressed. In general, the driver's intention to have acceleration is clearly reflected in the rate at which the accelerator pedal 30 is depressed, i.e., in general, the driver quickly depresses the accelerator pedal 30 when the driver desires an urgent acceleration. The control operation in step S201 may be defined as determining the driver's intention with regard to acceleration, or determining urgency of acceleration.

In step S202, the desired output power PWRREQ is retrieved from a desired output power map or table (not shown), which is prepared in advance, depending on the engine revolution rate NE and the current depressed amount $AP_n$ of the accelerator pedal 30.

Next, the control operation proceeds to step S203, in which it is determined whether the desired output power PWRREQ determined in step S202 is the upper limit of the output power of the motor during the motor drive mode at the current vehicle speed V, in other words, it is determined whether or not the current operating point of the vehicle is in the motor drive zone.

When the result of determination in step S203 is "YES", i.e., when the current operating point of the vehicle is in the motor drive zone, the operation proceeds to step S204. In contrast, when the result of determination in step S203 is "NO", i.e., when the current operating point of the vehicle is not in the motor drive zone, the operation proceeds to step S206.

In step S204, it is determined whether the movement ΔAP of the accelerator pedal 30 determined in step S201 is less than an engine start triggering movement $\Delta AP_{max}$ of the accelerator pedal 30, which is set in advance.

When the result of determination in step S204 is "YES" (i.e., $\Delta AP < \Delta AP_{max}$), the operation proceeds to step S205, in which the desired output power PWRREQ determined in step S202 is set as a motor output command CMDMOTPWR (CMDMOTPWR=PWRREQ), and the control operation in this routine is once terminated. In other words, when ΔAP is less than $\Delta AP_{max}$, it is determined that the acceleration demand is not urgent, and that the motor drive mode may be maintained without switching into the motor assist mode.

Because the upper limit of the output power of the motor-generator 3 during the motor drive mode is set to be less than the maximum output power of the motor-generator 3, as mentioned above, the power required for driving the vehicle in the motor drive mode is less than the maximum output power of the motor-generator 3.

In contrast, when the result of determination in step S204 is "NO" (i.e., $\Delta AP \geq \Delta AP_{max}$), the operation proceeds to step S206, in which the engine 2 is started.

Then, the control operation proceeds to step S207, in which an engine output command CMDENGPWR in calculated based on the engine revolution rate NE and the current depressed amount AP of the accelerator pedal 30.

Furthermore, the control operation proceeds to step S208, in which the motor output command CMDMOTPWR is calculated by subtracting the engine output command CMDENGPWR determined in step S207 from the desired output power PWRREQ determined in step S202.

$$CMDMOTPWR = PWRREQ - CMDENGPWR \qquad \text{Equation (2)}$$

In other words, even when the current operating point is in the motor drive zone, the fact that $\Delta AP$ is equal to or greater than $\Delta AP_{max}$ means that an urgent acceleration is required; therefore, the motor assist mode is selected to enhance responsiveness. As a result, an urgent and sharp acceleration can be obtained so that the driver's acceleration demand is fulfilled, and drivability of the vehicle is improved.

In this case, because the motor assist mode is selected, the motor-generator continues to output driving power even after the engine 2 is started. As a result, the power of the engine 2 is restrained, and it is possible to achieve the desired output power PERREQ using the engine together with the motor, and thus responsiveness of the vehicle may be improved while improving fuel economy.

According to Equation (2), the output power of the motor-generator 3 after starting of the engine 2 is decreased as the output power of the engine 2 increases. As a result, the motor-generator 3 is prevented from outputting power excessively, and electrical power is prevented from being consumed unnecessarily so that fuel economy may be improved.

Next, the control operation proceeds to step S209, in which it is determined whether the motor output command CMDMOTPWR determined in step S208 is less than the maximum output power of the motor-generator 3.

When the result of the determination in step S209 is "YES" (i.e., CMDMOTPWR<maximum output power of the motor-generator 3), the control operation in this routine is once terminated. In other words, in this case, the motor output command CMDMOTPWR calculated in step S208 is used as the motor output command CMDMOTPWR without any changes.

In contrast, when the result of the determination in step S209 is "NO" (i.e., CMDMOTPWR≧maximum output power of the motor-generator 3), the operation proceeds to step S210, in which the maximum output power of the motor-generator 3 is set to the motor output command CMDMOTPWR (i.e., CMDMOTPWR=maximum output power of the motor-generator 3), and the control operation in this routine is once terminated.

Through the control operations in steps S209 and S210, the motor output command CMDMOTPWR after starting of the engine 2 is limited to a level equal to or less than the maximum output power of the motor-generator 3.

Third Embodiment

Figure 6:
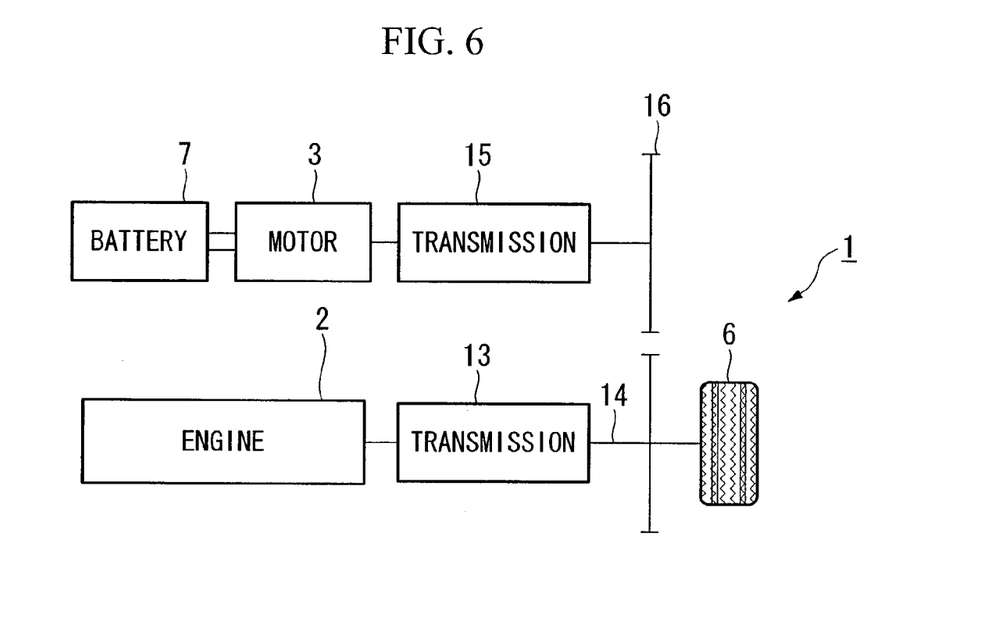
FIG. 6 is a schematic diagram showing the general structure of a power transmission system in a third embodiment of a hybrid vehicle according to the present invention.
Figure 7:
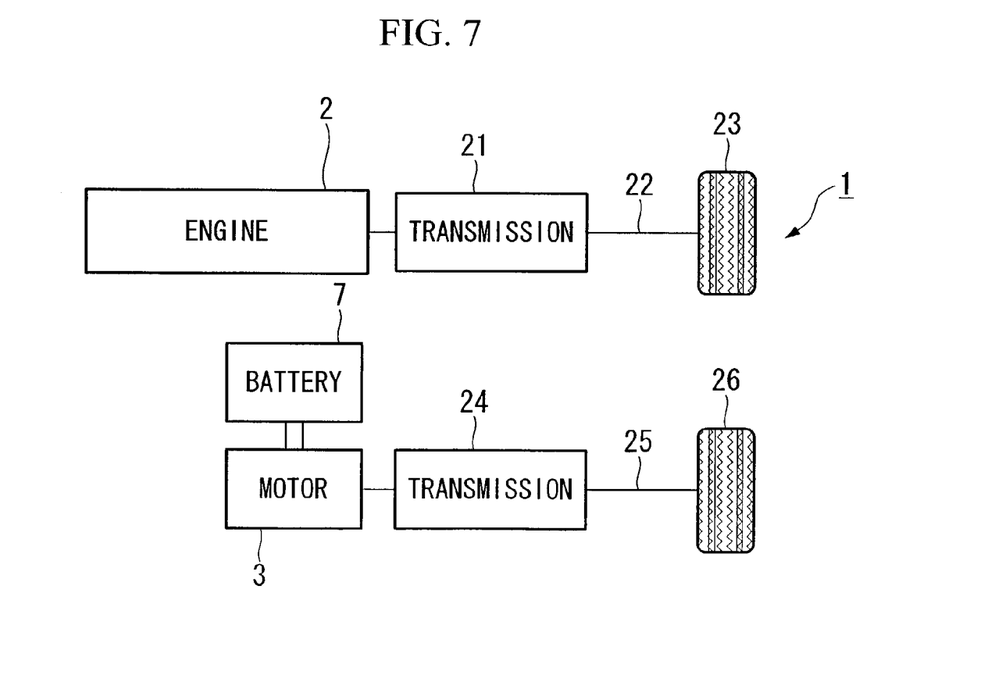
FIG. 7 is a schematic diagram showing the general structure of a power transmission system in a fourth embodiment of a hybrid vehicle according to the present invention.

The present invention is not limited to the application to the hybrid vehicle 1 shown in FIG. 1, and the present invention is also applicable to various types of parallel hybrid vehicles such as shown in FIGS. 6 and 7.

In the hybrid vehicle 1 shown in FIG. 6, as a third embodiment of the present invention, the driving power of an engine 2 is transmitted to driving wheels 6 via a first transmission 13 and an output shaft 14, and on the other hand, the driving power of a motor-generator 3 is transmitted to the output shaft 14 via a second transmission 15 and a gear 16, and is further transmitted to the driving wheels 6. In the hybrid vehicle 1, as in the hybrid vehicles discussed above, the driving power of one of the engine 2 and the motor-generator 3, or the driving power of both the engine 2 and the motor-generator 3 may be used for driving the vehicle.

Fourth Embodiment

In the hybrid vehicle 1 shown in FIG. 7, as a fourth embodiment of the present invention, the driving power of an engine 2 is transmitted to front driving wheels 23 via a first transmission 21 and an output shaft 22, and on the other hand, the driving power of a motor-generator 3 is transmitted to rear driving wheels 26 via a second transmission 24 and an the output shaft 25. In other words, in this hybrid vehicle 1, both the front and rear wheels are employed as driving wheels, and more specifically, the front wheels are driven by the engine 2, and the rear wheels are driven by the motor-generator 3. In this hybrid vehicle 1, as in the hybrid vehicles discussed above, the driving power of one of the engine 2 and the motor-generator 3, or the driving power of both the engine 2 and the motor-generator 3 may be used for driving the vehicle at a time. In this hybrid vehicle 1, connecting configuration between two power sources and the front and rear wheels may be made opposite, i.e., the driving power of the engine 2 may be transmitted to the rear wheels 26, and the driving power of the motor-generator 3 may be transmitted to the front wheels 23.

Advantageous Effects Obtainable by the Invention

As explained above, according to the hybrid vehicle of the present invention, it is possible to fulfill an acceleration demand just by increasing the output power of the motor without operating the engine when the movement of the accelerator pedal in a predetermined period, which defines the acceleration demand, is less than a predetermined amount.

According to another hybrid vehicle of the present invention, it is possible to fulfill an acceleration demand just by increasing the output power of the motor without operating the engine when predetermined conditions are satisfied and even when the operating point of the hybrid vehicle is in the motor drive zone. As a result, the engine may be prevented from being started and stopped frequently.

According to another hybrid vehicle of the present invention, it is possible to predict change in desired output power easily and accurately.

According to another hybrid vehicle of the present invention, the predicted output power can be reliably output by starting the engine even when the predicted output power cannot be output by the motor. As a result, the driver's acceleration demand can be achieved, and drivability of the vehicle may be improved.

According to another hybrid vehicle of the present invention, it is possible to fulfill an urgent acceleration demand by starting the engine when the hybrid vehicle is driven solely by the motor. As a result, responsiveness of the vehicle may be improved, and drivability of the vehicle may be also improved.

According to another hybrid vehicle of the present invention, the power of the engine is restrained, and it is possible to achieve the predicted and desired output power using the engine together with the motor while improving fuel economy.

According to another hybrid vehicle of the present invention, the motor may be prevented from outputting power excessively, and electrical power may be prevented from being consumed unnecessarily so that fuel economy may be improved.

According to another hybrid vehicle of the present invention, an unsmooth behavior of the vehicle may be avoided, and drivability of the vehicle may be improved.

According to another hybrid vehicle of the present invention, it is possible to fulfill an urgent acceleration demand, when the hybrid vehicle is driven solely by the motor, by starting the engine so that the engine is also used as a power source of the hybrid vehicle. As a result, responsiveness of the vehicle with respect to an acceleration demand is improved.

According to another hybrid vehicle of the present invention, it is possible to fulfill an urgent acceleration demand, when the operation state of the hybrid vehicle is in the motor drive zone in which the hybrid vehicle is driven solely by the motor, by starting the engine so that the engine is also used as a power source of the hybrid vehicle. As a result, responsiveness of the vehicle with respect to an acceleration demand may be improved.

According to another hybrid vehicle of the present invention, when the rate at which the accelerator pedal is depressed is high, the movement of the accelerator pedal in a predetermined period is large, and thus it is possible to determine that there is an urgent acceleration demand. As a result, the driver's intention to have acceleration may be reflected in the driving state, and drivability of the vehicle may be improved.

According to another hybrid vehicle of the present invention, the power of the engine is restrained, and it is possible to achieve the desired output power using the engine together with the motor. As a result, responsiveness of the vehicle may be improved while improving fuel economy.

According to another hybrid vehicle of the present invention, an excessive output of the motor may be prevented, and unnecessary consumption of electrical power may be also prevented so that fuel economy may be improved.

According to another hybrid vehicle of the present invention, it is possible to restrain the power of the motor after starting of the engine to a level below the maximum output power of the motor.

According to another hybrid vehicle of the present invention, it is possible to drive the hybrid vehicle solely by the motor.

What is claimed is:

1. A hybrid vehicle comprising:
   a single, cylinder-deactivateable engine and a single motor as power sources, output power of at least one of the engine and the motor is transmitted to driving wheels for driving the hybrid vehicle;
   an accelerator pedal for increasing and decreasing driving power of the hybrid vehicle; and
   a drive control section which is provided for operating and stopping the engine and the motor, and which is adapted to control the engine and the motor wherein when the engine is stopped and the motor is operated solely for driving the hybrid vehicle, change in desired output power is predicted, and the engine is maintained to be stopped, even when the predicted output power falls in a drive zone in which the engine is supposed to be operated, when movement of the accelerator pedal in a predetermined period is less than a predetermined amount, wherein the motor is controlled and outputs the predicted output power for continuing drive of the vehicle solely by the motor, and wherein a cylinder deactivation control operation is executed to maintain intake and exhaust valves of all cylinders of the engine in a closed position and is applied to the engine to reduce a pumping loss thereof.

2. A hybrid vehicle according to claim 1, wherein a drive zone in which the motor is operated solely for driving the hybrid vehicle is defined as a motor drive zone.

3. A hybrid vehicle according to claim 1, wherein change in desired output power is predicted based on the movement of the accelerator pedal in the predetermined period.

4. A hybrid vehicle according to claim 1, wherein the drive control section starts the engine regardless of whether the movement of the accelerator pedal in the predetermined period is less than the predetermined amount when the predicted output power is greater than the maximum output power of the motor.

5. A hybrid vehicle according to claim 4, wherein the drive control section maintains the output power of the motor even after the engine starts.

6. A hybrid vehicle according to claim 5, wherein the drive control section decreases the output power of the motor as the output power of the engine increases after starting of the engine.

7. A hybrid vehicle according to claim 1, wherein the drive control section starts the engine when the movement of the accelerator pedal in the predetermined period is greater than the predetermined amount.

8. A hybrid vehicle according to claim 1, wherein the drive control section limits a change in the output power of the motor to be in a predetermined range.

9. A hybrid vehicle comprising:
   a single, cylinder-deactivateable engine and a single motor as power sources, the output power of at least one of the engine and the motor being transmitted to driving wheels for driving the hybrid vehicle;
   an accelerator pedal for increasing and decreasing driving power of the hybrid vehicle; and
   a drive control section which is provided for operating and stopping the engine and the motor, and which is adapted to control the engine and the motor in such a manner that, when the motor is operated solely for driving the hybrid vehicle, the engine is started when the movement of the accelerator pedal in a predetermined period is greater than a predetermined amount, and wherein a cylinder deactivation control operation is executed to maintain intake and exhaust valves of all cylinders of the engine in a closed position and is applied to the engine to reduce a pumping loss thereof.

10. A hybrid vehicle according to claim 9, wherein a drive zone in which the motor is operated solely for driving the hybrid vehicle is defined as a motor drive zone, and the drive control section is further adapted to control in such a manner that the engine is started in the motor drive zone.

11. A hybrid vehicle according to claim 9, wherein the movement of the accelerator pedal in the predetermined period is determined by the rate at which the accelerator pedal is depressed.

12. A hybrid vehicle according to claim 9, wherein the drive control section is further adapted to control in such a manner that the motor is maintained to output power even after starting of the engine.

13. A hybrid vehicle according to claim 12, wherein the drive control section is further adapted to control in such a manner that the output power of the motor after starting of the engine is limited to be less than the maximum output power of the motor.

14. A hybrid vehicle according to claim 13, wherein the maximum output power of the motor is set to be greater than the power which is necessary to drive the hybrid vehicle solely by the motor.

15. A hybrid vehicle according to claim 9, wherein the drive control section is further adapted to control in such a manner that the output power of the motor is decreased as the output power of the engine increases after starting of the engine.

* * * * *